US009002775B1

(12) United States Patent
Harrison et al.

(10) Patent No.: US 9,002,775 B1
(45) Date of Patent: Apr. 7, 2015

(54) SYSTEMS AND METHODS FOR ESTIMATING A REMAINING USEFUL LIFE OF AN ITEM

(75) Inventors: Gregory A. Harrison, Oviedo, FL (US); Michael A. Bodkin, Orlando, FL (US); Sreerupa Das, Oviedo, FL (US); Richard Hall, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 359 days.

(21) Appl. No.: 13/472,547

(22) Filed: May 16, 2012

Related U.S. Application Data

(60) Provisional application No. 61/530,789, filed on Sep. 2, 2011, provisional application No. 61/622,141, filed on Apr. 10, 2012.

(51) Int. Cl.
*G06F 9/44* (2006.01)
*G06N 7/00* (2006.01)
*G06N 99/00* (2010.01)

(52) U.S. Cl.
CPC .............. *G06N 7/005* (2013.01); *G06N 99/005* (2013.01)

(58) Field of Classification Search
None
See application file for complete search history.

(56) References Cited

U.S. PATENT DOCUMENTS

| 6,301,572 | B1 | 10/2001 | Harrison |
| 7,277,823 | B2 | 10/2007 | Harrison et al. |
| 7,478,013 | B2 | 1/2009 | Harrison et al. |
| 7,734,443 | B2 * | 6/2010 | De et al. ........................ 702/132 |
| 7,797,062 | B2 * | 9/2010 | Discenzo et al. ............... 700/28 |
| 8,082,115 | B2 * | 12/2011 | Bechhoefer et al. ............ 702/34 |
| 8,285,438 | B2 * | 10/2012 | Mylaraswamy et al. .... 701/29.9 |
| 2011/0043536 | A1 * | 2/2011 | Cobb et al. ..................... 345/629 |
| 2011/0167024 | A1 | 7/2011 | Maldonado Diaz et al. |

OTHER PUBLICATIONS

Klesk, Przemyslaw, "Construction of a Neurofuzzy Network Capable of Extrapolating (and Interpolating) With Respect to the Convex Hull of a Set of Input Samples in Rn," IEEE Transactions on Fuzzy Systems, Oct. 2008, pp. 1161-1179, vol. 16, No. 5.

Rejer, Izabela et al., "A Hypertube as a Possible Interpolation Region of Neural Model," Proceedings of the 8th International Conference on Artificial Intelligence and Soft Computing, Lecture Notes in Computer Science, Jun. 25-29, 2006, pp. 123-132, vol. 4029, Zakopane, Poland, Springer-Berlin Heidelberg.

Reynolds, Tom et al., "Analysis of Separation Minima Using a Surveillance State Vector Approach," 3rd USA/Europe Air Traffic Management R&D Seminar, Jun. 13-16, 2000, 10 pages, Napoli, Italy.

(Continued)

*Primary Examiner* — Kakali Chaki
*Assistant Examiner* — Mai T Tran
(74) *Attorney, Agent, or Firm* — Withrow & Terranova, PLLC

(57) ABSTRACT

Systems and methods are disclosed for more accurately estimating a remaining useful life (RUL) of an item. The RUL of the item is estimated by determining probability values throughout a time period. Each probability value quantifies a probability that a failure event of the item will occur by a time in a time segment of the time period. Based on the probability values, the particular time segment in which the failure event is most likely to occur is determined. Once the particular time segment is determined, the presentation of a visual representation of at least a portion of the time period can be effected. The visual representation indicates that the failure event of the item is most likely to occur during the particular time segment.

21 Claims, 12 Drawing Sheets

(56) References Cited

OTHER PUBLICATIONS

Xu, Rui et al., "Neural Network-Based Clustering," Clustering (book), Chapter 5, Oct. 2009, pp. 111-162, Wiley-IEEE Press, Hoboken, NJ.
Non-final Office Action for U.S. Appl. No. 13/434,072 mailed Mar. 10, 2014, 38 pages.
Abbas, M. et al., "A hierarchical framework for fault propagation analysis in complex systems," Autotestcon, 2009, 6 pages.
Budde, C. et al., "Impact damage detection for fiberglass composite rotor blade," Proceedings of the Annual Forum of the American Helicopter Society, May 2009, 11 pages.
Carpenter, G.A. et al., "Fuzzy ART: fast stable learning and categorization of analog patterns by an adaptive resonance system," Neural Networks, vol. 4, 1991, pp. 759-771.
Chung, Y. et al., "Application of phase detection frequency domain reflectometry for locating faults in an F-18 flight control harness," IEEE Transactions on Electromagnetic Compatibility, vol. 42, No. 2, 2005, pp. 327-334.
Department of Defense, "Condition based maintenance plus (CBM+) for materiel maintenance," No. 4151.22, Dec. 2, 2007, 11 pages.
Deriche, M. "Bearing fault diagnosis using wavelet analysis," Computers, Communication & Signal Processing Conference, 2005, pp. 197-201.
Friswell et al., "Crack identification in rotating machines with active bearings," Proceedings of the ISMA, 2010, pp. 2843-2855.
Hale, B., "An alternative vision for CBM+ for the Air Force," Air Force Journal of Logistics, Jun. 2005 vol. XXVIV, No. 1, pp. 43-45.
Harrison, G. A. et al., "CBM+ system for ship condition monitoring," Fourteenth International Ship Control Systems Symposium, Ottawa, Canada, Sep. 21-23, 2009, 10 pages.
Hochmann, D. et al., "Envelop bearing analysis: theory and practice," Aerospace Conference, 2005, pp. 3658-3666.
Jaw. L.C. et al., "CBM+ research environment—facilitating technology development, experimentation, and maturation," IEEE Aerospace Conference, 2008, 6 pages.
Karakowski, J. et al., "A fuzzy hypercube artificial neural network classifier," Research and Development Technical Report CECOM-TR-98-4, U.S. Army Communcations-Electronics Command, Oct. 1998, 47 pages.
Kautz, W.H., "Testing for faults in wiring networks," IEEE Transactions on Computers, vol. C-23, Iss. 4, 1974, pp. 358-363.
Kohonen, T., "Self-Organizing Feature Maps," in Self-Organization and Associative Memory, New York, Springer-Verlag, 1988, pp. 119-137.
Lebold, M. et al., "Review of vibration analysis methods for gearbox diagnostics and prognostics," Proceedings of the 54th meeting of the Society for Machinery Failure Prevention Technology, May 1-4, 2000, pp. 623-634.
Schubert, L. et al., "Structural health monitoring of a rotor blade during statical load test," 18th International Conference on Database and Expert Systems Applications, 2007, pp. 297-301.
Wan, S. et al., "The fault diagnosis method of rolling bearing based on wavelet packet transform and zooming envelop analysis," vol. 3, 2007, pp. 1257-1261 Proceedings of the 2007 International Conference on Wavelet Analysis and Pattern Recognition, Beijing, China.
U.S. Army, "CBM+ Roadmap," Dec. 13, 2007, 83 pages.
Watola, D. et al., "Automated Downlink Analysis for the Deep Space Network," NASA TDA Progress Report 42-126, Aug. 15, 1996, http://ipnpr.jpl.nasa.gov/progress_report/42-126/126F.pdf, 19 pages.
Non-Final Office Action for U.S. Appl. No. 13/434,072, mailed Sep. 3, 2014, 40 pages.
Notice of Allowance for U.S. Appl. No. 13/591,697, mailed Jul. 22, 2014, 10 pages.

* cited by examiner

SYSTEMS AND METHODS FOR ESTIMATING A REMAINING USEFUL LIFE OF AN ITEM

RELATED APPLICATIONS

This application claims the benefit of provisional patent application Ser. No. 61/530,789, filed Sep. 2, 2011, and provisional patent application Ser. No. 61/622,141, filed Apr. 10, 2012, the disclosures of which are hereby incorporated herein by reference in their entireties.

FIELD OF THE DISCLOSURE

Embodiments of the present disclosure relate to methods and systems for estimating a remaining useful life (RUL) of an item.

BACKGROUND

Estimating a remaining useful life (RUL) of an item, such as a vehicle, machine, or even a simpler component, like a battery or bolt, is often a very difficult task, one which often leads to inaccurate results. For example, the RUL of an item is often estimated utilizing a consumption curve. The consumption curve is prepared using historical data regarding a population of the same types of items. To estimate the RUL, the slope of the consumption curve is determined and subsequently, the RUL is calculated from the slope. Unfortunately, no manufacturing process can make every item exactly the same. Inherently, there will be at least slight physical, electrical, and/or chemical differences for every item manufactured. Given the physical, electrical, and/or chemical differences between different manufactured items, the consumption curve can only generalize the behavior of the same types of items, and thus, often does not estimate the RUL of the specific item with sufficient precision. Inaccurate estimations of RUL lead to wasted resources because items are repaired or replaced when in actuality, neither was necessary. On the other hand, inaccurate estimations of RUL can lead to dangerous situations when items continue to be used despite actually needing repair or replacement. Note that RUL may be given as wall-clock time (non-stopping) or usage time (such as Engine-On time). Therefore, what are needed are more accurate systems and methods of estimating the RUL of an item.

SUMMARY

The disclosure relates generally to systems and methods for estimating a remaining useful life (RUL) of an item. The systems and methods disclosed herein may more accurately estimate the RUL of the item because the estimation of the RUL is specific to the item. Embodiments of the methods and systems may also allow for the RUL estimation in real-time.

To more accurately estimate the RUL, various probability values of the item may be determined for a time period. Each probability value corresponds to a different time segment in the time period and quantifies a probability that a failure event of the item will occur by a time in the time segment. In other words, the probability values are each quantifying the probability that the failure event occurs at or before the time in the time segment. Subsequently, a particular time segment in which the failure event is most likely to occur may be determined based on the probability values. From the determination of the particular time segment, presentation of a visual representation of at least a portion of the time period can be effected. The visual representation indicates that the failure event of the item is most likely to occur during the particular time segment. The visual representation thus may provide relevant personnel with a more accurate indication of the RUL for that specific item, thereby avoiding the unnecessary maintenance while avoiding dangerous situations.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6:
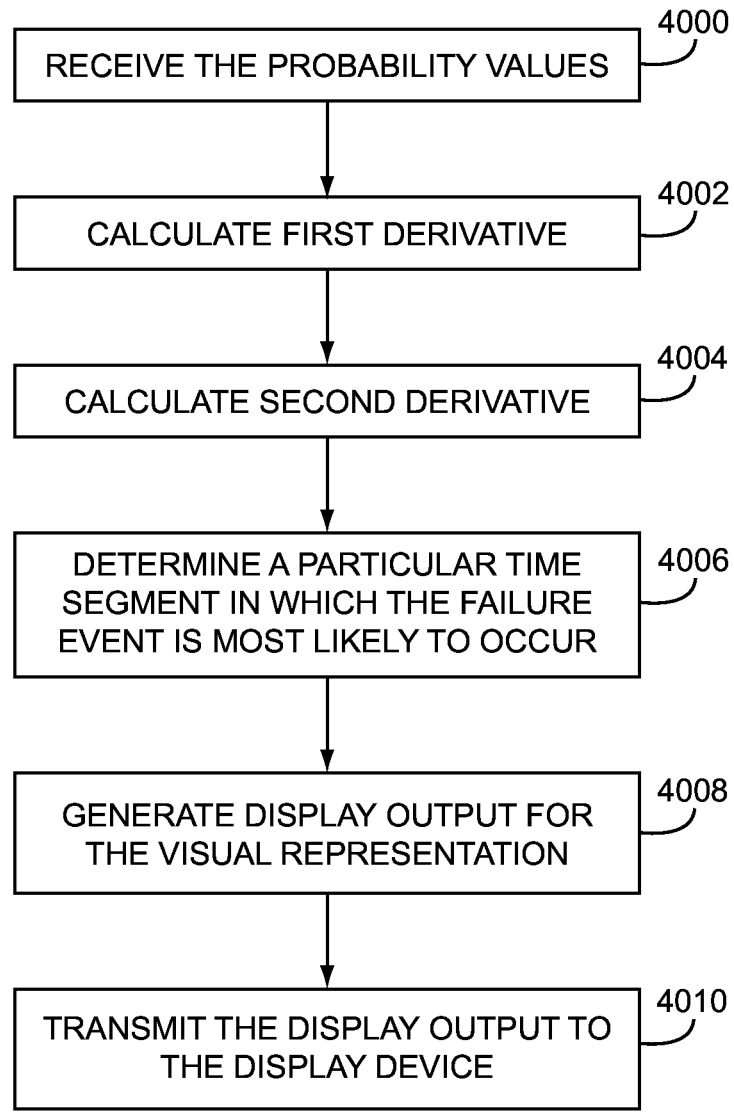

FIG. 6 is a flowchart illustrating a method that may be implemented by the RUL estimation module so as to determine a particular time segment of the time period in which the failure event is most likely to occur based on the probability values and to effect presentation of a visual representation of at least a portion of the time period where the visual representation indicates that the failure event is most likely to occur during the particular time segment.

Figure 7A:
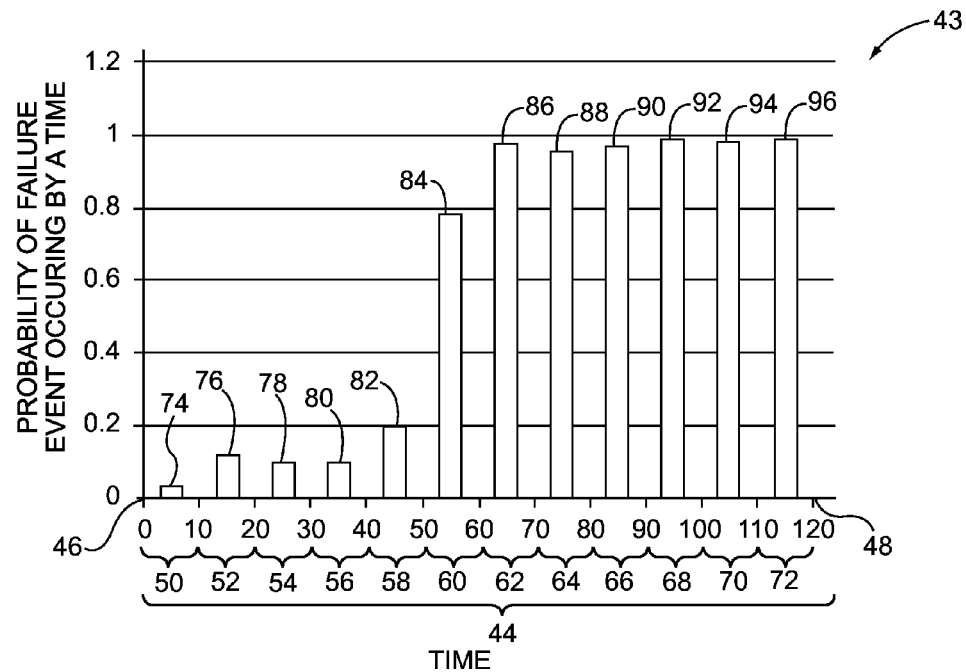

FIG. 7A is a bar chart that represents probability value versus time segment data that may be used to determine the particular time segment in which the failure event is most likely to occur, according to one embodiment.

Figure 7B:
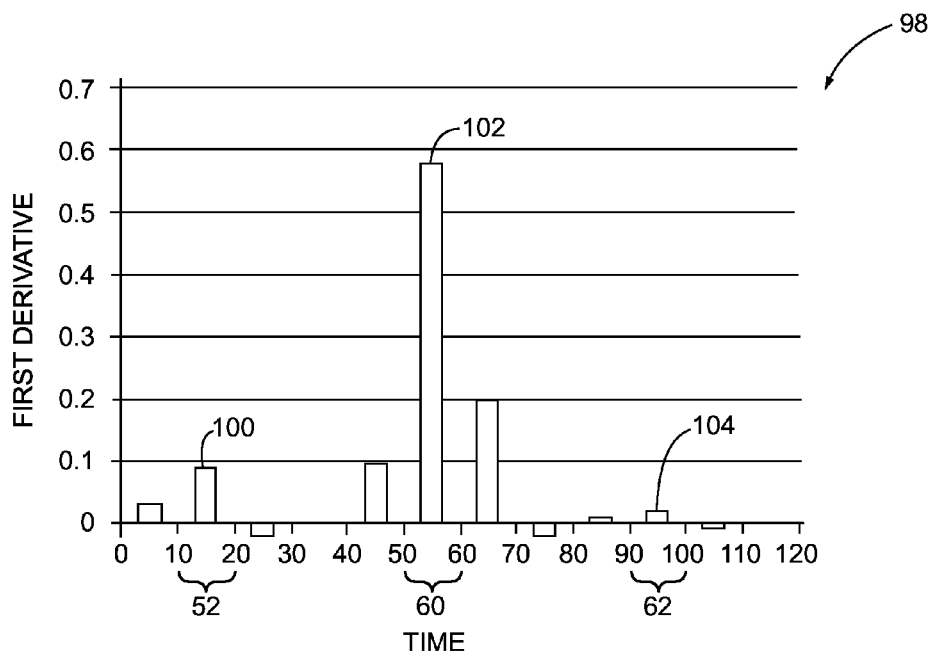

FIG. 7B is a bar chart that represents a first derivative of the probability value versus time segment data shown in FIG. 7A.

Figure 7C:
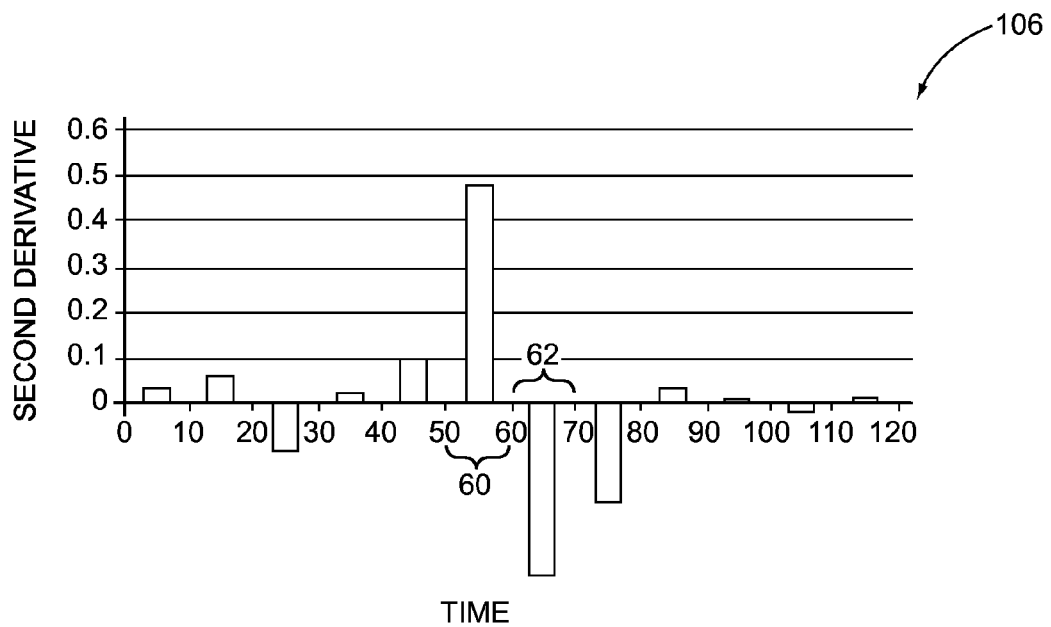

FIG. 7C is yet another bar chart that represents a second derivative of the probability value versus time segment data shown in FIG. 7A.

Figure 2:
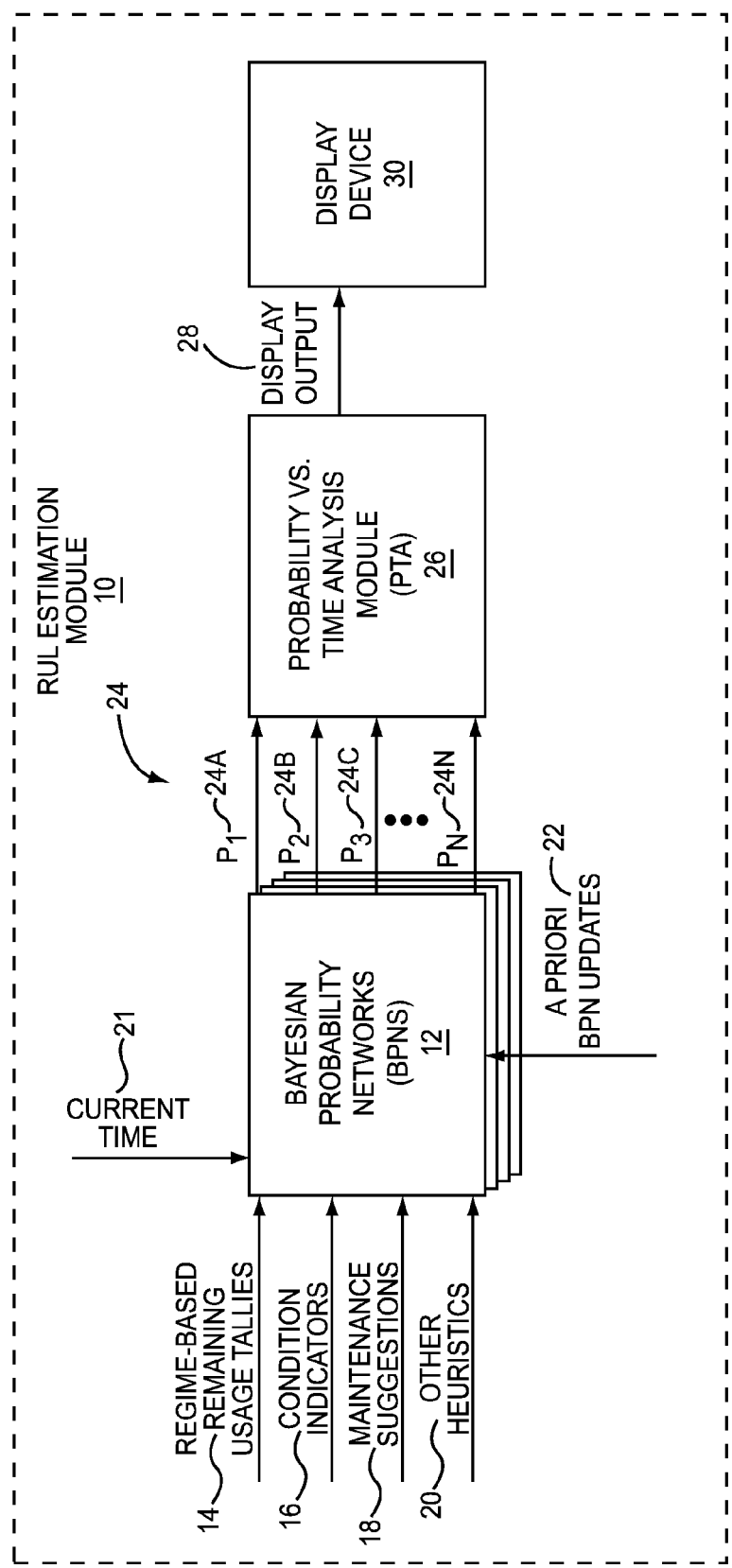
FIG. 2 is a block diagram of an exemplary RUL estimation module configured to estimate the RUL of the item in accordance with the exemplary method illustrated in FIG. 1.
Figure 8:
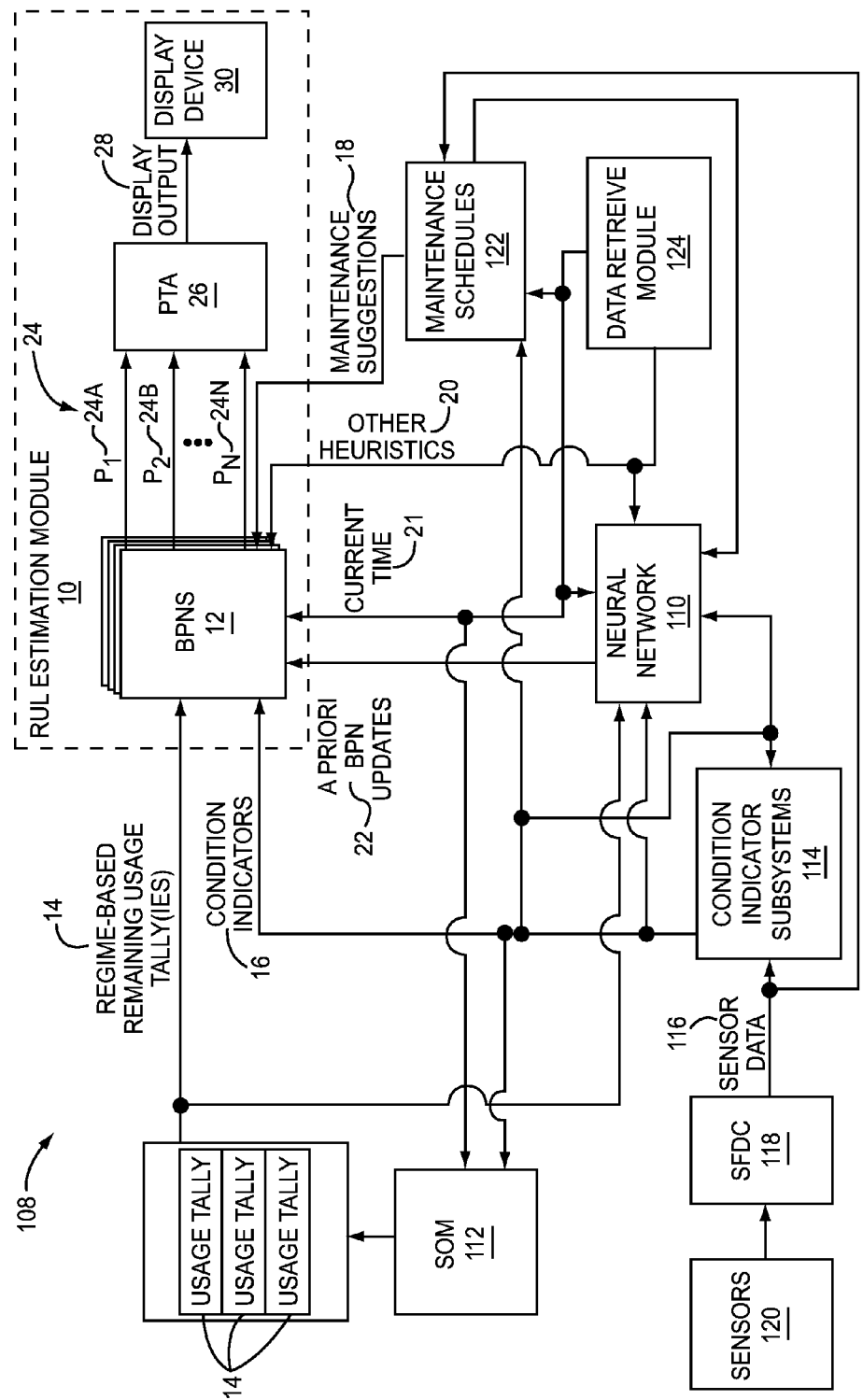

FIG. 8 illustrates an exemplary RUL system that includes the RUL estimation module shown in FIG. 2, according to one embodiment.

Figure 9:
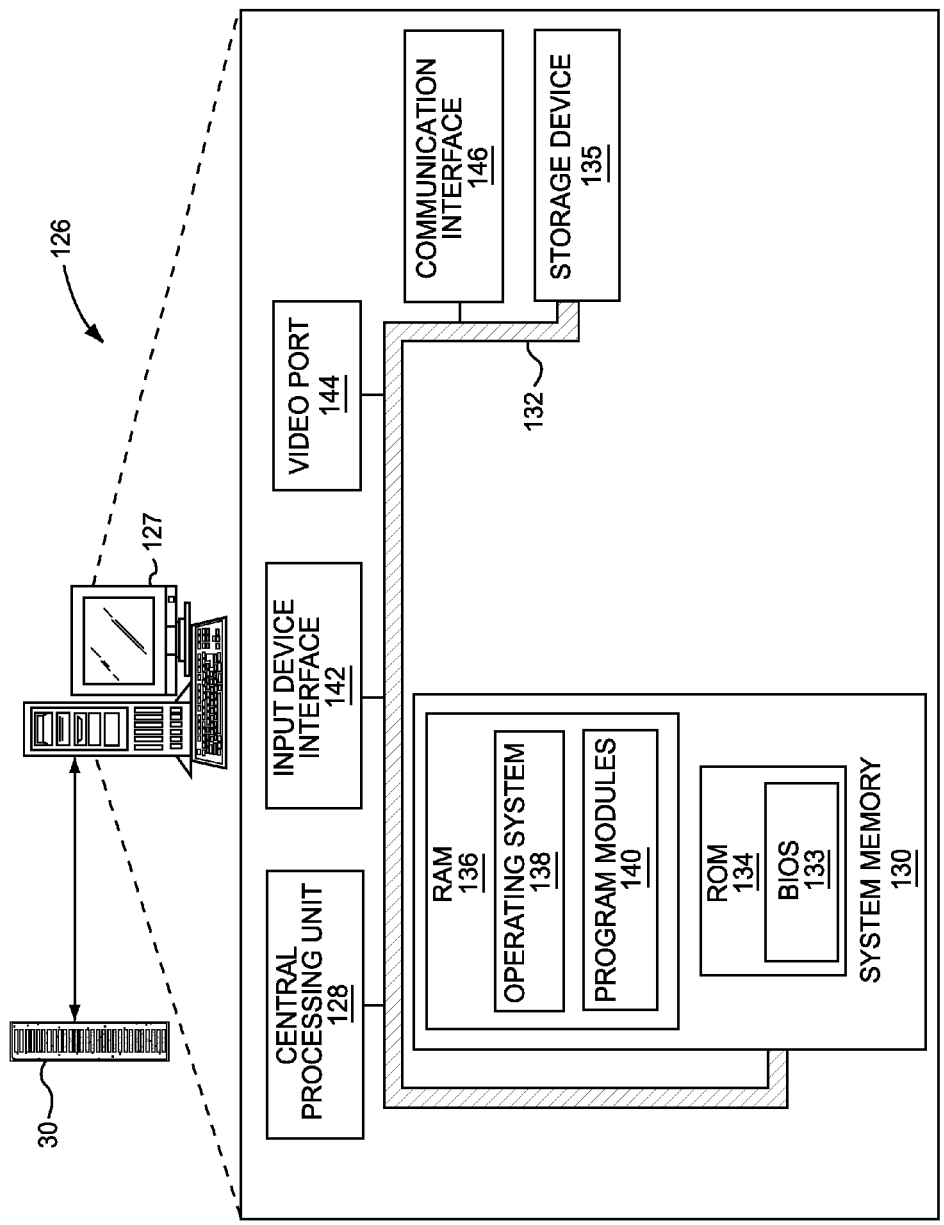

FIG. 9 is a block diagram of an exemplary apparatus, in this case a computing device, suitable to implement the RUL estimation module and the RUL system as shown in FIGS. 2 and 8.

DETAILED DESCRIPTION

The embodiments set forth below represent the necessary information to enable those skilled in the art to practice the embodiments and illustrate the best mode of practicing the embodiments. Upon reading the following description and in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates generally to systems and methods for estimating a remaining useful life (RUL) of an item. The item may be any device considered to have a finite life span. For example, the item may be a vehicle (e.g., an airplane; a helicopter; a ship; a submarine; or a ground vehicle, such as an automobile, a jeep, a tank, or a High Mobility Multipurpose Wheeled Vehicle (HMMWV, sometimes referred to as a "Humvee")), a robot, a missile, a firearm, a radar system, and/or the like. The item may also be a machine included within another device, such as a vehicle management system, an electrical system, an engine, a transmission for the engine, a gearbox, a cooling system, a lubrication system, and/or the like. In addition, the item may be a passive component included within another device, such as a tire, a bearing landing skid, a landing float, a bolt, a rotor, a propeller, a wing, a vertical stabilizer, a horizontal stabilizer, a fin, a drive shaft, a fuselage, a mast, a door, a stabilizer bar, a chassis, a hose, a lubricant, and/or the like. Finally, the item may comprise combinations of several machines, combinations of machines and passive components, combinations of passive components, and/or the like. For instance, an engine can be considered to be the combination of several other machines and passive components.

Generally, the RUL of the item is defined by a time duration remaining until an occurrence of a failure event ending the life of the item. The failure event may be any event after which the item no longer has the ability to operate in accordance with the item's designed purpose, the item is significantly impaired in its ability to achieve the item's designed purpose, and/or the item experiences a condition (such as a structural, mechanical, electrical, or chemical condition) that is considered unsafe.

Figure 1:
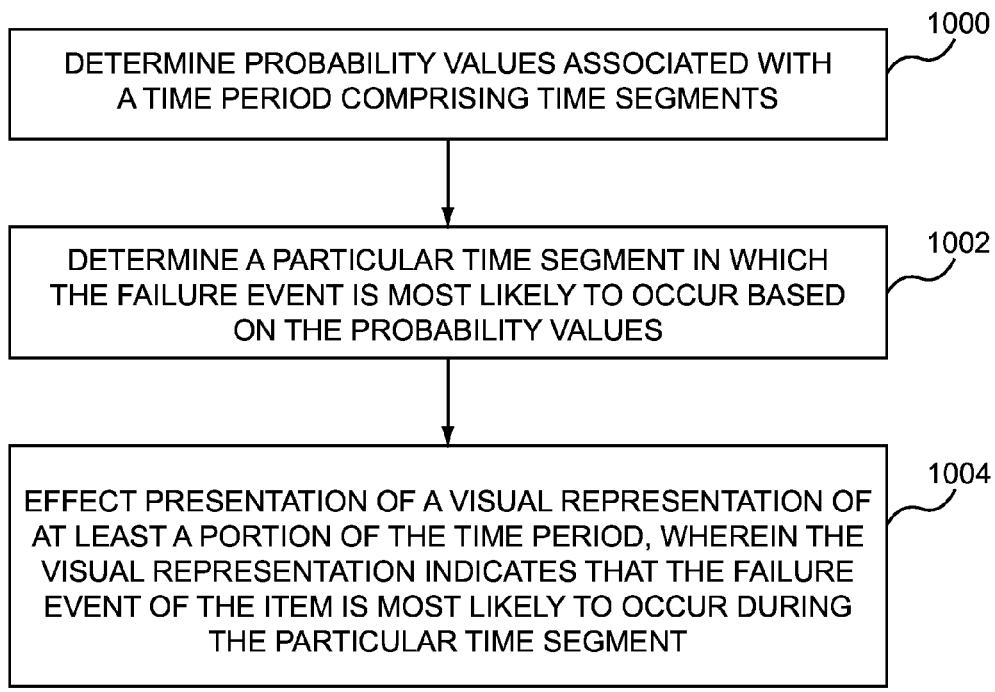
FIG. 1 is a flowchart illustrating one embodiment of an exemplary method of estimating the RUL of an item.

FIG. 1 illustrates exemplary procedures that may be utilized to implement one embodiment of a method of estimating the RUL of an item. As explained in further detail below, the exemplary procedures shown in FIG. 1 may be implemented by an RUL estimation module. To estimate the RUL of an item, the RUL estimation module may initially determine probability values associated with a time period comprising time segments (procedure 1000). The time period may temporally extend from a starting time to some future ending time that is displaced from the starting time. For instance, the starting time may be a current time or a time that was once recorded as the current time. The future ending time may be some arbitrarily selected time in the future. The time segments are temporally defined within the time period relative to the current time. In some embodiments, each of the time segments is successive to one another so that the time period defines various successive time segments. Thus, as the current time progresses, the time segments will also progress forward in time since the time segments are defined relative to the current time.

Each of the probability values associated with the time period corresponds to a different one of the time segments and quantifies a probability that a failure event of the item will occur by a time in that time segment. In other words, the probability value quantifies the probability that the failure event will occur at or prior to the time within the time segment. For example, the probability value may quantify the probability that the failure event will occur from theoretical negative infinity time to the time in the time segment. In other embodiments, the probability value quantifies the probability that the failure event occurs sometime between a time of manufacture and the time in the time segment. In still other embodiments, the probability value quantifies the probability that the failure event occurs between a time of installation and the time in the time segment.

Next, the RUL estimation module may determine a particular time segment in which the failure event is most likely to occur based on the probability values (procedure 1002). Note that the probability values described above in procedure 1000 do not quantify a probability that the failure event occurs within the time segment, but rather quantify the probability that the failure event will occur by a time. The particular time of the time segment may, for example, be an end time or, if desired, any other time within the time segment. Consequently, an analysis of the probability values and/or relationships between the probability values may be implemented to determine the particular time segment in which the failure event is most likely to occur. As explained below, one embodiment of the RUL estimation module calculates a first derivative of the probability values and a second derivative of the probability values with respect to time to identify a knee of the probability values. The particular time segment that corresponds to this knee is the particular time segment in which the failure event is most likely to occur. Once the RUL estimation module determines the particular time segment, the RUL estimation module effects presentation of a visual representation of at least a portion of the time period (procedure 1004). The visual representation indicates the particular time segment in which the failure event is most likely to occur. There can be many displays provided, each representing different machinery or aspects of the system that are monitored for health. To effect the presentation of the RUL estimation module, the RUL estimation module may generate and transmit a display output to a display device. The display output may be an analog signal and/or digital data, such as control signals, visual image data, and/or parameters for visual image data. The visual representation is presented by the display device so that the appropriate personnel are informed of the particular time segment in which the failure event of the item is most likely to occur. In this manner, repair or replacement of the item can be scheduled more accurately.

Figure 1A:
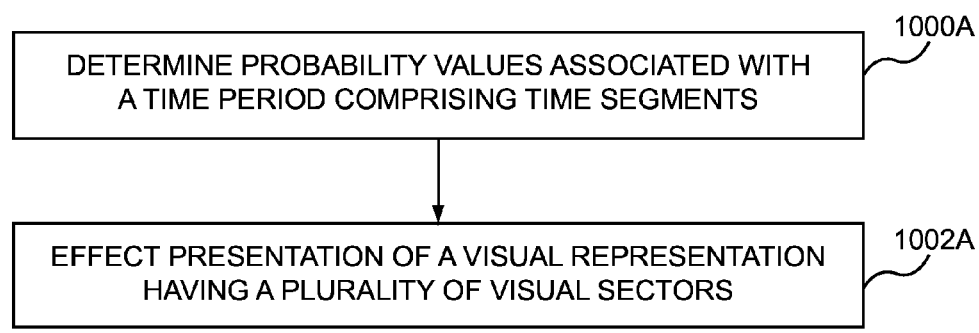
FIG. 1A is a flowchart illustrating another embodiment of an exemplary method of estimating the RUL of an item.

FIG. 1A illustrates exemplary procedures of another embodiment of a method of estimating the RUL of the item. To begin, the RUL estimation module may determine probability values associated with a time period comprising time segments (procedure 1000A). Each probability value quantifies a probability that the failure event will occur by a time in the time segment. For example, the time may be an end time of the time segment or any other desired time. Once the RUL estimation module determines the probability values, the RUL estimation module effects presentation of a visual representation having a plurality of visual sectors (procedure 1002A). In this embodiment, each visual sector of the plurality of visual sectors represents a different one of the plurality of time segments. Furthermore, the visual representation is effected so that, for each visual sector, a visual intensity of a visual characteristic of the visual sector is related to a probability value that corresponds to the time segment being represented by the visual sector. For example, the luminosity of each visual sector may be related to the probability value of the time segment being represented by the visual sector. Alternatively or additionally, the brightness, hue, saturation, strength of illumination, color intensity, and/or the like of the visual sector may be determined by the probability value of the time segment being represented by the visual sector.

FIG. 2 illustrates a block diagram of one embodiment of an RUL estimation module 10 configured to estimate the RUL of an item. In this case, the item may be a machine within a vehicle. An apparatus adapted to provide the RUL estimation module 10 may be mounted on the vehicle so that the RUL of the machine can be estimated while the vehicle is in operation. Furthermore, the RUL estimation module 10 may be operable to estimate the RUL of various items of the vehicle simultaneously, such as other machines and components of the vehicle. For example, one embodiment of the RUL estimation module 10 is configured to estimate the RUL of each of six subsystems in a helicopter, namely: a vehicle management system (VMS), a control system, an electrical system, a drive system, a rotor system, a propulsion system, and a structural system.

The RUL estimation module 10 may implement an artificial intelligence network to determine the probability values. The artificial intelligence network may determine the probability values using operational indicators as a priori conditions. In other words, the probability of the failure event occurring changes depending on operational events that have or are occurring to the item. To determine the probability values quantifying the probability that the failure event occurs by a time in the time segments, the artificial intelligence system assumes that the operational indicators have occurred. In this manner, the artificial intelligence network can more accurately estimate the RUL of the item because the probability values are determined in light of the operational events presently occurring or that have occurred to the item.

It should be noted that while these operational indicators are used as a priori conditions to determine the probability values, the operational indicators themselves may be determined analytically or empirically. Thus, using the operational indicators as a priori conditions does not refer to how the knowledge regarding these operational indicators was acquired. Rather, the operational indicators are used as a priori conditions because the conditions are known to have occurred prior to the calculation of the probability value.

The artificial intelligence network may be an adaptive learning probability network. The adaptive learning probability network may comprise any one or more of a Bayesian network, a neural network, a heuristic model, a stochastic model, decision tree learning, genetic programming, support vector machines, reinforcement learning, a regression model, a Gaussian mixture model, and/or the like. In this embodiment, the artificial intelligence network includes a plurality of Bayesian Probability Networks (BPNs) 12. Alternative embodiments may utilize other types of probability networks. The BPNs 12 input various operational indicators, such as regime-based remaining usage tallies 14, condition indicators 16, maintenance suggestions 18, and other heuristics 20. Each of the plurality of operational indicators indicates an operational characteristic related to the item. For example, the regime-based remaining usage tallies 14 are each usage credits assigned to an item. The usage credits are expended at different rates during operation, depending on the manner of operation and/or time duration since installation. Initially, the regime-based remaining usage tallies 14 can be determined analytically through the use of an RUL estimation curve but, as explained in further detail below, they are usually updated empirically depending on how the item has been used.

The condition indicators 16 are consolidated parameters that have been derived from sensor data to describe the operating condition of the item. The maintenance suggestions 18 may be statistics-based edicts that recommend that the item or a part of the item be serviced on a certain schedule (i.e. every 5000 miles). Other heuristics 20 can be included in the estimation of RUL, such as the weight of a vehicle, the location of the item, the outside temperature, the relative humidity, and/or the radiation measurement of the environment. The operational indicators may change as the operational characteristics of the item change over time.

As shown in FIG. 2, the BPNs 12 also input the current time 21. For instance, the BPNs 12 may input a current time 21 which may be a time measured with reference to some absolute time, a current run-time, and/or the like. The time segments may be defined within the time period as having some time displacement relative to the current time 21. As the current time 21 progresses, so do the displacements of the time segments relative to the current time 21. Thus, the time period may progress forward in time as the current time 21 also progresses.

To determine the probability values, the RUL estimation module 10 inputs a set of one or more operational indicators into the BPNs 12. Each of the BPNs 12 may be assigned to a particular time segment within the time period and may be configured to determine the probability value. This set of the operational indicators may be received by the BPNs 12 in real-time. The BPNs 12 may be based on a probabilistic graphical model that represents the probabilistic relationships between operational indicators of the item and the probability that an event will occur by a time. The BPNs 12 may have been previously trained to learn these relationships.

Assuming that the current time 21 of the time period is at zero (0) and the ending time of the time period is at a time displacement (T), an equation that theoretically describes this concept is shown below:

$$P(F_{Event} / \text{Operational Indicators}, t_x) =$$
$$P(F_{Event\ Occurring\ by\ t1} / \text{Operational Indicators}) / 0 < t1 <$$
$$\frac{T}{N} + P(F_{Event\ Occurring\ by\ t2} / \text{Operational Indicators}) / \frac{T}{N} < t2 <$$
$$\frac{2T}{N} + P(F_{Event\ Occurring\ by\ t3} / \text{Operational Indicators}) \left| \frac{2T}{N} < t3 < \right.$$
$$\frac{3T}{N} \ldots + P(F_{Event\ Occurring\ by\ time\ tN} / \text{Operational Event Indicators}) \left|$$
$$\frac{(N-1)T}{N} < tN < T$$

P($F_{Event}$|Operational Indicators)=probability function that quantifies the probability that the failure event occurs given the set of operational indicators as a priori conditions;

P($F_{Event\ Occurring\ by\ tx}$|Operational Indicators, $t_x$)=each is a probability function assigned to a probability node quantifying a probability that the failure event occurs by the time $t_x$ where the time $t_x$ is within the time segment of the time periods and provided that the set of operational indicators are the a priori conditions. The probability values may be determined orthogonally by a different one of the BPNs 12; and N=number of time segments in the time period.

When the artificial intelligence network is being trained, the ability to garner time-specific information may be facilitated by the segmentation of histograms, which are based on the historical data of previous items of the same item type and on the analysis of the recorded failure characteristics and their failure times. In one embodiment, the artificial intelligence network further includes a neural network that learns to link the probability nodes in the BPNs 12 using the historical data. However, the neural network may provide a posteriori BPN updates 22 during the training of the BPNs 12 so that the BPNs 12 are taught a target result for use in adjusting its probability weights. Alternatively, rather than an artificial intelligence network, a more complex Bayes' theorem equation that includes multiple sources of probability information related to RUL or sensed conditions, as well as historical data based on previous items of the same item type, may be utilized to calculate the probability values for each of the time segments. In other embodiments, the artificial intelligence network may include other types of networks other than the BPNs 12 to determine the probability values. For example, the artificial intelligence network may utilize fuzzy logic networks, data mining, machine learning, evolutionary computing networks, simulated annealing networks, expectation-maximization networks, non-parametric networks, and/or the like.

The probability values output from the BPNs 12 may be considered as conditional probability values since the probability values are provided given a priori conditions. Each conditional probability value quantifies the probability that the failure event of the item will occur by the time tx in the time segment, based on the set of operational indicators. In the embodiment described above, each conditional probability value is determined using the same set of operational indicators as the a priori conditions. However, in alternative embodiments, the set of operational indicators may instead be utilized to determine future sets of operational indicators for some or all of the time segments. For instance, the set of operational indicators received in real-time may be utilized for the initial time segment. With regard to subsequent time segments, future sets of operational indicators may be calculated using an integral technique. To calculate the future sets of operational indicators, the integral technique may utilize histograms that describe the expected temporal evolution of the operational indicators. The integral technique may increase the accuracy of the probability values because the probability of the failure event may be affected by the history of previous operational events. For instance, if an engine is to be driven in rough conditions as opposed to favorable conditions, the probability values in future time segments will be affected. The integral technique allows for the evolution of the operational indicators of the engine to be taken into account throughout the time period.

Referring again to FIG. 2, the BPNs 12 output the probability values 24A-24N (generally, probability values 24) that correspond to each of the time segments. The probability values 24 are output by the BPNs 12 to a Probability vs. Time Analysis Module (PTA) 26. The PTA 26 analyzes the probability values 24 to determine the particular time segment in the time period in which the failure event is most likely to occur. From this, the PTA 26 generates a display output 28 to effect presentation of a visual representation of at least a portion of the time period. In this embodiment, the RUL estimation module 10 transmits the display output 28 to a display device 30. The display output 28 has been configured by the PTA 26 so that the visual representation indicates that the failure event of the item is most likely to occur during the particular time segment. The PTA 26 has been configured so that the PTA 26 knows that the probability values 24A-24N from a particular one of the BPNs 12 correspond to a particular one of the time segments.

Alternatively, the PTA 26 is operable to receive the probability values 24 in order to control a visual intensity for a visual characteristic of the visual sectors. In particular, the PTA 26 may be operable to generate the display output 28 so that the visual intensity for a visual characteristic of each of the visual sectors is related to the probability value of the particular time segment being represented by the particular visual sector.

Figure 3:
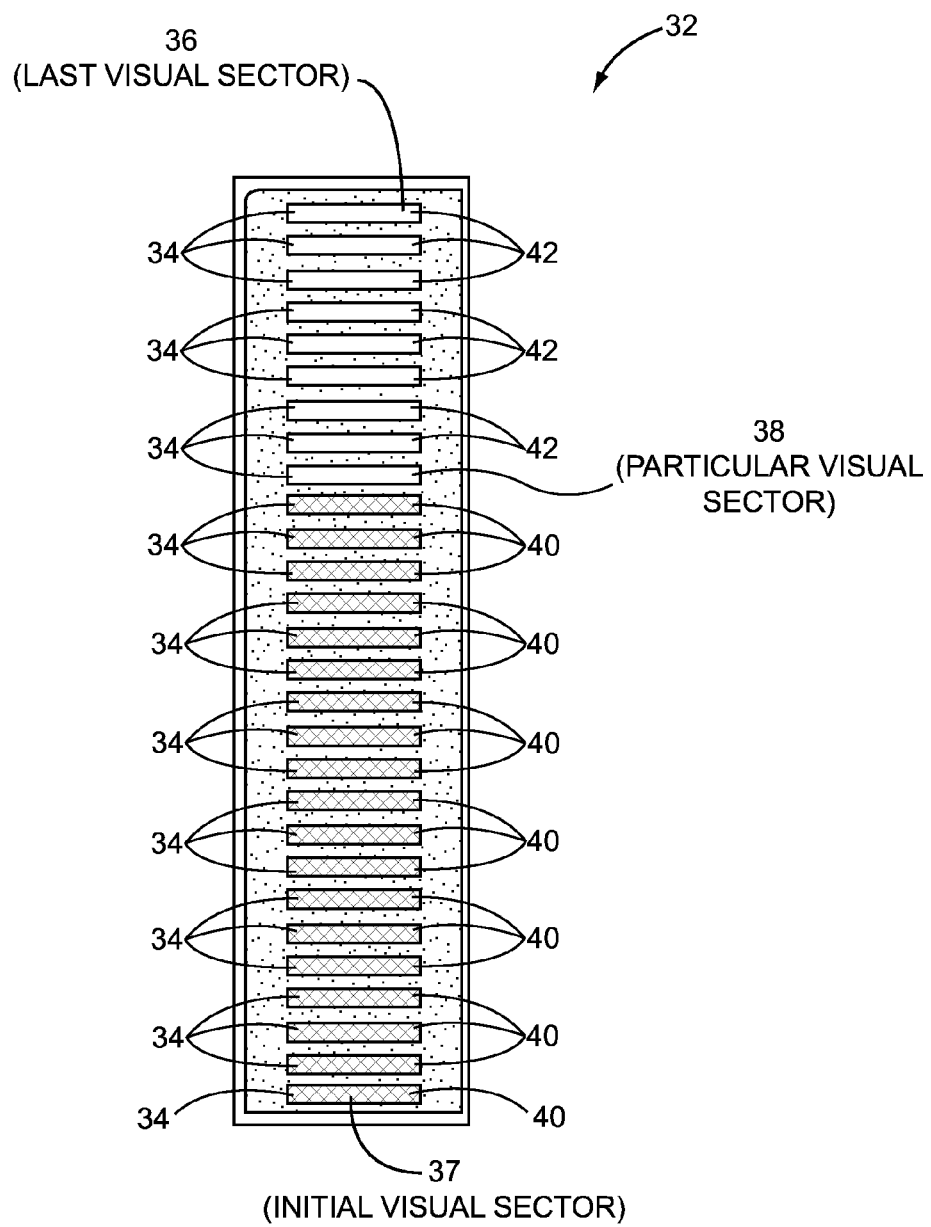
FIG. 3 is a diagram illustrating one embodiment of a visual representation of a time period that indicates a particular time segment in which a failure event of the item is most likely to occur.

FIG. 3 illustrates one embodiment of a visual representation 32 that may be presented by the display device 30. The display output 28 has effected presentation of the visual representation 32 via the display device 30 of the RUL estimation module 10, as shown in FIG. 2. In FIG. 3, the visual representation 32 may have a plurality of visual sectors 34. Each of the plurality of visual sectors 34 corresponds to different time segments within the time period. In this embodiment, the visual sectors 34 are each physically ordered to correspond to the temporal order of the time segments. Particularly, an initial visual sector 37 corresponds to the time segment that begins with the start time (i.e. the current time) of the time period. The last visual sector 36 corresponds to the time segment ending at the end time (i.e. current time+displacement time) of the time period. Accordingly, the visual representation 32 includes the visual sectors 34 for all of the time segments, and thus represents the entire time period. Nevertheless, in other embodiments, only portions of the time period may be represented. The visual representation 32 simply needs to represent a sufficient portion of the time period so that the particular time segment in which the failure event of the item is most likely to occur can be indicated by the visual representation 32.

As shown in FIG. 3, a particular visual sector 38 represents the particular time segment in which the failure event is most likely to occur. Visual sectors 40 are provided in a first visual state and correspond to the time segments in the time period before the particular time segment in which the failure event is most likely to occur. In one embodiment, the visual sectors 40 may be a particular color such as green or may be turned on. The particular visual sector 38 corresponding to the time segment in which the failure event of the item is most likely to occur is represented in a second visual state. For example, the particular visual sector 38 may be red or may be turned off. Additionally, visual sectors 42 corresponding to time segments after the particular time segment in which the failure event of the item is most likely to occur are also in the second visual state. Thus, in this embodiment, although the visual sectors 42 are also in the second visual state, the visual representation 32 indicates that the failure event of the item is most likely to occur during the particular time segment by transitioning from the first visual state of the visual sectors 40 to the second visual state at the particular visual sector 38.

In an alternative implementation, the particular visual sector 38 corresponding to the time segment in which the failure event of the item is most likely to occur may be represented in red. Visual sectors 40 that correspond to the time segments in the time period before the particular time segment in which the failure event is most likely to occur may be provided in green. Visual sectors 42 corresponding to time segments after the particular time segment in which the failure event of the item is most likely to occur may be inactive.

In another embodiment of the visual representation 32, some visual sectors 34 may be provided in a flashing visual state while other visual sectors 34 may be provided in one or more non-flashing visual states, such as green, red, on, or off. For instance, assume that the particular time segment in which the failure event most likely occurs was originally safely far off in the future, thus providing the transition at the particular visual sector 38 as described above. However, although the RUL estimation module 10 may have originally determined that the failure event was not likely to occur until the particular time segment corresponding to the particular visual sector 38, the item may suddenly experience an unexpected and hazardous operational event. The probability values corresponding to the time segments much nearer to the current time 21 will suddenly increase very rapidly. In response to detecting that the unexpected and hazardous operational event is prematurely imminent, the RUL estimation module 10 may provide one of the visual sectors 40 corresponding to the imminent or premature time segment in the flashing visual state. The other visual sectors 34 may be maintained in their original non-flashing visual states (green, red, on, off) until the emergency situation passes. The flashing visual state may also be accompanied by audible signals indicating that there is an emergency situation.

In yet another embodiment, the visual intensity of the particular visual sector 38 indicates that the failure event of the item is most likely to occur within the particular time segment. For example, the visual intensity of the particular visual sector 38 may be clearly greater than the visual intensity of the other visual sectors 34. On the other hand, the visual intensity of the particular visual sector 38 may be clearly less than the visual intensity of the other visual sectors 34.

With regard to the display device 30 that presents the visual representation 32, the display device 30 may be either analog and/or digital, and may be mounted, in one embodiment, on the item. For example, if the item comprises a ground vehicle, the display device 30 may be mounted within view of a driver of the ground vehicle. In one embodiment, the display device 30 is analog and includes Light Emitting Diodes (LEDs) that are stacked and powered by an electronic driver circuit in response to the display output 28 from the PTA 26. Each visual sector 34 includes one of the LEDs and each LED can be controlled by providing the display output 28 as analog signals to the electronic driver circuit in order to set the visual state of the LED. Alternatively, the display device 30 may be digital and provide the visual representation 32 through computer graphics on a graphic user interface. Each visual sector 34 is thus computer-generated. The display output 28 can thus include visual image data that controls the visual state of each of the visual sectors 34 in the visual representation 32.

Figure 3A:
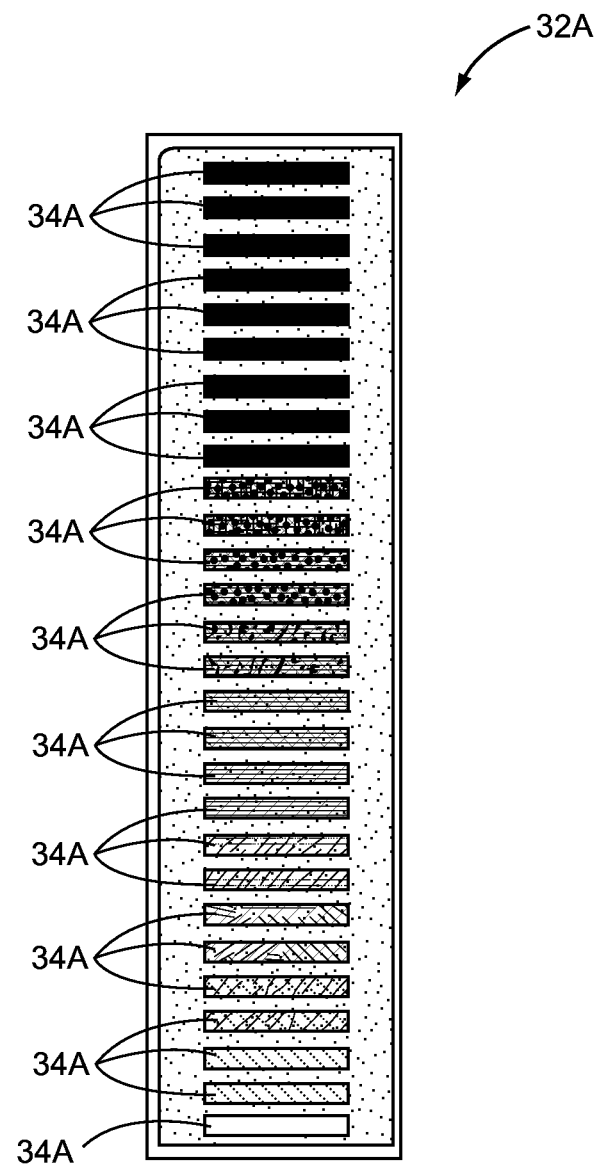
FIG. 3A is a diagram illustrating another embodiment of a visual representation of the time period where a visual intensity of a visual characteristic of the visual sectors is set in accordance with the probability values.

FIG. 3A illustrates another embodiment of a visual representation 32A. The visual representation 32A has a plurality of visual sectors 34A. Each visual sector 34A represents a different one of the plurality of time segments of the time period. In addition, in this embodiment a visual intensity for a visual characteristic of the visual sectors 34A is set in accordance with the probability value corresponding to the particular time segment being represented by the visual sectors 34A. In the specific embodiment of the visual representation 32A shown in FIG. 3A, the illumination from the visual sectors 34A is strengthened as the probability values increase. This is demonstrated in FIG. 3A as the shading of the visual sectors 34A goes from white to black along the visual sectors 34A.

Figure 4:
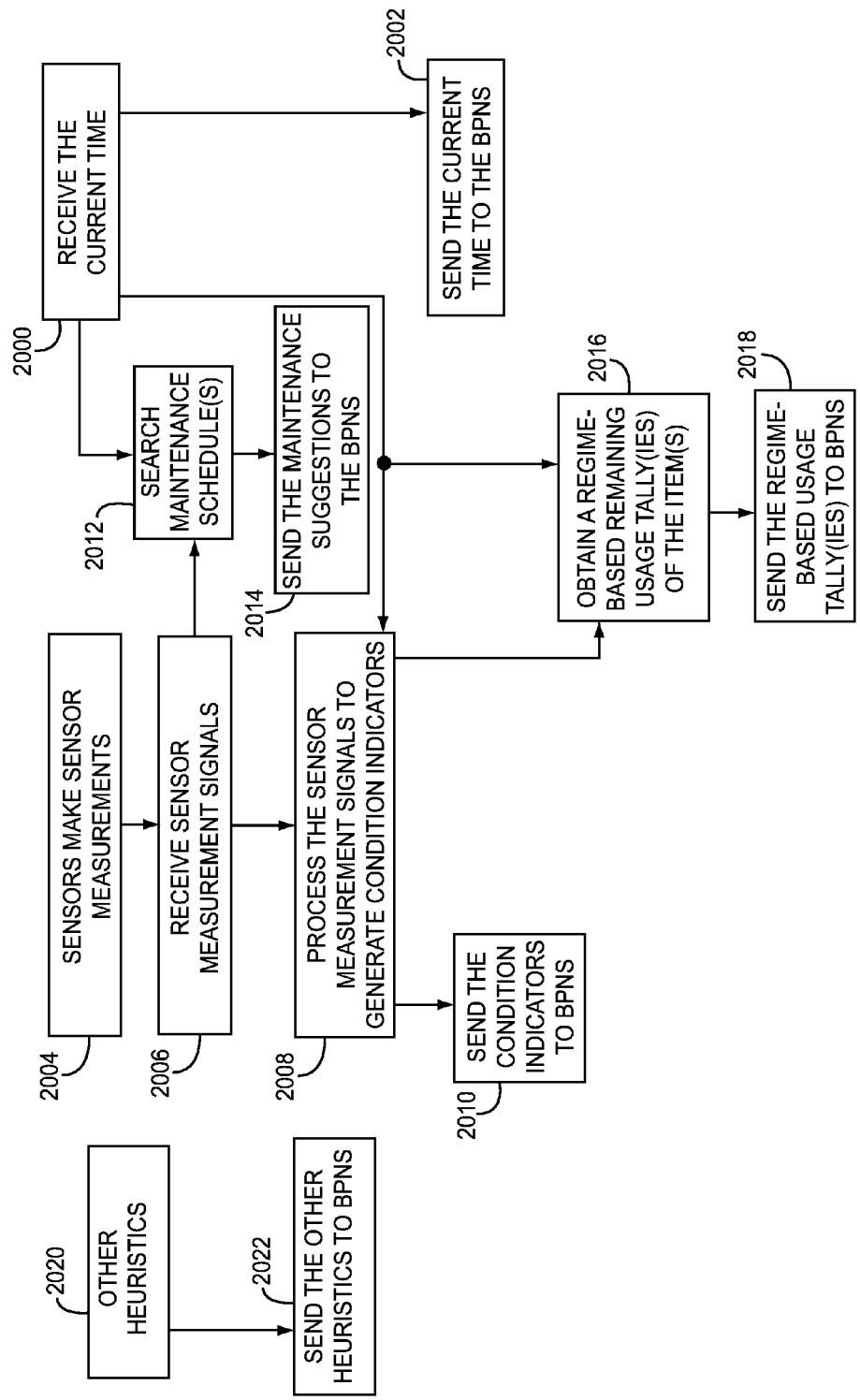
FIG. 4 illustrates exemplary procedures that may be implemented to provide a set of operational indicators to the RUL estimation module, shown in FIG. 2, by an RUL system that includes the RUL estimation module, according to one embodiment.

FIG. 4 illustrates exemplary procedures that may be implemented to provide the set of operational indicators and the data defining the time period to the BPNs 12. FIG. 4 shall be discussed in conjunction with FIG. 2. The BPNs 12 may receive the set of operational indicators from an RUL system. It should be noted that the types of operational indicators may differ in accordance with the type of item(s) being monitored and the individual operational characteristics of that specific item(s). Each type of item, and even each specific item, may have different physical, electronic, and/or chemical characteristics that are important in properly assessing the item's health. Therefore, the BPNs 12 may be provided with different operational indicators depending on the type of item(s) and/or the specific item(s) being monitored.

The exemplary procedures in FIG. 4 provide both operational indicators whose knowledge may be considered to have been acquired empirically, analytically, and/or a mixture of both. Again, while the knowledge of the operational indicators may be considered a posteriori, a priori, and/or a mixture of both, the operational indicators are used as a priori conditions to determine the probability values. In particular, the analytical operational indicators allow for the RUL to be estimated in accordance to prior analytical knowledge about the operational events, item type, and/or even the specific item itself. On the other hand, the empirical operational indicators allow for the RUL to be determined empirically according to detected operational events of the specific item. This is particularly advantageous for items that operate in dynamic environmental settings. In addition, even items that do not operate in dynamic environmental settings benefit from the use of operational indicators as a priori conditions. For instance, the actual operation of a specific item can differ from the general behavior of the item type as a result of unpredictable nuances in the manufacturing process of the item. These dynamic environmental settings and unpredictable nuances can therefore lead to variations in the RUL of the specific item.

In the exemplary procedures of FIG. 4, an RUL system receives a current time 21 (procedure 2000). In this manner, the time period and time segments within the time period can progress in time along with the current time 21. Once the RUL system obtains the current time 21, the RUL system sends the current time 21 to the BPNs 12 (procedure 2002).

To obtain empirical data regarding the item(s), sensors may make sensor measurements (procedure 2004). These sensors are provided on the item, components of the item, and/or components affecting the operational events of the item and/or items. These sensors may include any type of sensor that can generate information relevant to the health of the items. For example, the sensors may include micro-electro-mechanical accelerometers, tri-axial wireless accelerometers, G-Link wireless accelerometers and other types of G-Link wireless sensors, piezoelectric sensors, thermocouples, tachometers, temperature sensors, and/or the like. In one embodiment, the sensors are mounted strategically on a helicopter and are used to monitor the structural, mechanical, electrical, and chemical characteristics of the helicopter subsystems, such as the VMS control system, the electrical system, the drive system, the rotor system, the propulsion system, and the structural system of the helicopter.

Next, the RUL system may receive sensor measurement signals from the sensors (procedure 2006). These sensor measurement signals may be digital and/or analog signals that provide various sensor measurements from the sensors. The sensor measurement signals are then processed to generate condition indicators 16 (procedure 2008). As explained in further detail below, the RUL system may fuse the sensor data to generate the condition indicators 16. In some embodiments, the condition indicators 16 are assumed to be the condition indicators 16 for the entire time period. Alternatively or additionally, condition indicators 16 may also be determined based on the expected evolution of the condition indicators 16 for future time segments. The RUL system then sends the condition indicators 16 to the BPNs 12 (procedure 2010).

As shown in FIG. 4, the RUL system may also search maintenance schedules (procedure 2012). These maintenance schedules include maintenance suggestions 18 that propose maintenance for the item(s). These maintenance schedules may be derived from information provided by the manufacturer. In this case, the current time 21 and the sensor data may be utilized to search maintenance schedules for the maintenance suggestions 18. Maintenance suggestions 18 may be determined for the current time 21 only or may be determined for future time segments as well. The RUL system then sends the maintenance suggestions 18 to the BPNs 12 (procedure 2014).

Next, the RUL system may obtain a regime-based remaining usage tally(ies) 14 (procedure 2016). The regime-based remaining usage tally 14 indicates a remaining use of the item(s). In one embodiment, the regime-based remaining usage tally 14 is initially determined from a regime-based RUL curve of the item using the current time 21 of the time period. Once the regime-based remaining usage tally 14 has been initially determined from the regime-based RUL curve of the item, the regime-based remaining usage tally 14 may be stored and utilized in a next iteration of the procedures provided in FIG. 4. On the next iteration, the RUL system may obtain the previous regime-based remaining usage tally 14 and update it based on the condition indicators 16 of the item. This generates an updated regime-based remaining usage tally 14 that indicates an updated remaining use of the machine. Also, the regime-based remaining usage tally 14 of the item for the next iteration may be the updated regime-based remaining usage tally 14. In this manner, the regime-based remaining usage tally 14 can be integrated over time depending on the expenditure of remaining usage indicated by the condition indicators 16 of the item. The same technique may be utilized to determine the evolution of the condition indicators 16, if desired. Once the regime-based remaining usage tally(ies) 14 of the item(s) has been obtained, the RUL system sends the regime-based remaining usage tally(ies) 14 to the BPNs 12 (procedure 2018).

As shown in FIG. 4, the RUL system may also receive other heuristics 20 for the item(s) (procedure 2020). The other heuristics 20 may be any type of heuristic that affects the RUL of the item(s). In one embodiment of the RUL system designed to monitor the RULs of the items in a vehicle, various other heuristics 20 can affect the RULs of each of the items. For example, the other heuristics 20 may indicate a weight of a vehicle, a location where the vehicle is being operated, an outside temperature, a relative humidity, and/or the like. These other heuristics 20 can be retrieved by the RUL system from independent apparatuses designed to measure the other heuristics 20. Once the other heuristics 20 are obtained, the RUL system sends the other heuristics 20 to the BPNs 12 (procedure 2022).

Figure 5:
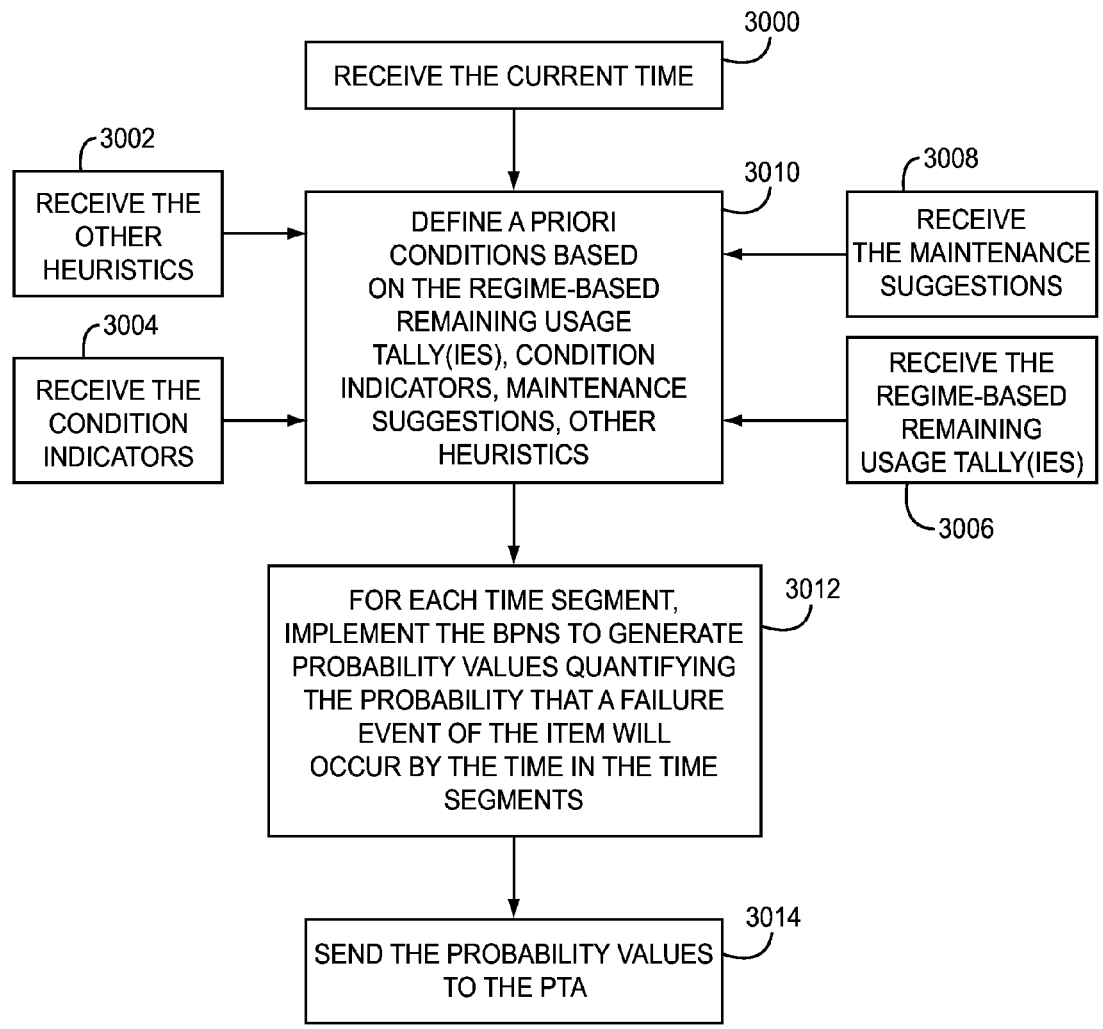
FIG. 5 illustrates exemplary procedures that may be implemented by the RUL estimation module so as to determine probability values associated with a time period, according to one embodiment.

FIG. 5 illustrates one embodiment of procedures that may be utilized by the BPNs 12 to implement the exemplary procedure 1000, described above with FIG. 1, along with other related exemplary procedures. The BPNs 12 may receive the current time 21 (procedure 3000). The BPNs 12 also receive the other heuristics 20, the condition indicators 16, the regime-based remaining usage tally(ies) 14 of the item(s), and the maintenance suggestions 18 (procedures 3002, 3004, 3006, and 3008, respectively). The BPNs 12 define a priori conditions based on the regime-based remaining usage tally(ies) 14, the condition indicators 16, the maintenance suggestions 18, and the other heuristics 20 (procedure 3010). As explained above, the set of operational indicators may define the a priori conditions of the item during every time segment of the time period. On the other hand, sets of future operational indicators may be determined for future time segments of the time period using the set of operational indicators of the item. The a priori conditions for the future time segments may be defined by the future event indicators that correspond to that time segment. If there are various items, then various sets of the operational indicators, which may or may not be mutually exclusive, may be provided for each of the various items.

Next, the BPNs 12 are implemented to generate a probability value (referred to generally as element 24 and individually as 24A-24N) quantifying the probability that a failure event of the item occurs by the time in the time segments (procedure 3012). Accordingly, each time segment of the time period has a corresponding probability value 24A-24N for the item. If there are multiple items, each time segment may have a corresponding probability value 24A-24N for each one of the multiple items.

The probability values 24 of the item being monitored may each be output from a different one of the BPNs 12 that has been configured to determine one of the probability values 24A-24N for a particular time segment. If there are multiple items, probability values 24 may be provided for each one of the multiple items. The BPNs 12 then send the probability values 24 to the PTA 26 (procedure 3014). The PTA 26 is configured to know that the probability values 24A-24N from a particular one of the BPNs 12 are for a particular time segment.

FIG. 6 illustrates one embodiment of procedures that may be utilized by the PTA 26 to implement the exemplary procedures 1002 and 1004, described above with FIG. 1, along with other related exemplary procedures. The exemplary procedures illustrated in FIG. 6 are for one item. If there are multiple items, parallel implementations of the exemplary procedures shown in FIG. 6 may be performed for each item.

In this embodiment, the PTA 26 receives the probability values 24 of the item (procedure 4000). As previously discussed, each probability value 24 quantifies the probability that the failure event occurs by the selected time within a particular time segment. In one embodiment, the probability values 24 are analyzed to find a knee of the probability values. The knee corresponds to the particular time segment in which the failure event is most likely to occur. In essence, the knee estimates the probability of the failure event occurring in the time segment because the knee indicates a rapid change of the probability values. To determine the particular time segment in the time period that includes the knee, the PTA 26 may calculate the first derivative of the probability values 24 (procedure 4002). Next, the PTA 26 calculates the second derivative (procedure 4004). The PTA 26 then determines the particular time segment in which the failure event is most likely to occur (procedures 4006). The knee will be the peak local maxima in the first derivative. The first derivative is thus searched for peaks and the second derivative is used to confirm whether the peak is one of the local maxima. The highest of the local maxima will be identified as the knee.

It should be noted that while the embodiment described in FIG. 6 determines the knee of the probability values 24 to determine the particular time segment in which the failure event is most likely to occur, the PTA 26 may implement other types of mathematical techniques to determine the particular time segment. Next, to effect the presentation of the visual representation 32, the PTA 26 then generates the display output 28 for the visual representation 32 (procedure 4008). As discussed above, the particular characteristics of the display output 28 may depend on the particular embodiment of the display device 30 being utilized by the RUL estimation module 10. The PTA 26 then transmits the display output 28 to the display device 30 (procedure 4010). Using the display output 28, the display device 30 presents the visual representation 32 so that the visual representation 32 indicates the particular time segment in which the failure event is most likely to occur.

In alternative embodiments, the PTA 26 does not determine in what time segment the failure event is most likely to occur. Instead, the PTA 26 generates the display output 28 for the visual representation 32A where a visual intensity of a visual characteristic of each of the visual sectors 34A are provided in accordance with the probability value 24 of the time segment being represented by the particular visual sector 34 (FIG. 3A). In this manner, a human may be able to discern when the failure event is likely to occur.

FIG. 7A illustrates a bar chart 43 that visually expresses an embodiment of the probability values for the item with respect to the time period 44. In this case, the time period 44 has a temporal duration of 120 time units. The time period 44 has a start time 46 and an end time 48. The start time 46 may be the current time 21. There are twelve successive time segments 50, 52, 54, 56, 58, 60, 62, 64, 66, 68, 70, and 72 that are defined in the time period 44. The time segment 50 is defined as $0 \leq t < 10$. The time segment 52 is defined as $10 \leq t < 20$. The time segment 54 is defined as $20 \leq t < 30$. The time segment 56 is defined as $30 \leq t < 40$. The time segment 58 is defined as $40 \leq t < 50$. The time segment 60 is defined as $50 \leq t < 60$. The time segment 62 is defined as $60 \leq t < 70$. The time segment 64 is defined as $70 \leq t < 80$. The time segment 66 is defined as $80 \leq t < 90$. The time segment 68 is defined as $90 \leq t < 100$. The time segment 70 is defined as $100 \leq t < 110$. The time segment 72 is defined as $110 \leq t < 120$. The bar chart 43 also plots each of the probability values 74, 76, 78, 80, 82, 84, 86, 88, 90, 92, 94, and 96 that quantify the probability that the failure event occurs by a time within one of the time segments 50, 52, 54, 56, 58, 60, 62, 64, 66, 68, 70, and 72, respectively. Each of the probability values 74, 76, 78, 80, 82, 84, 86, 88, 90, 92, 94, and 96 has been determined orthogonally by the BPNs 12 as described by the equation provided above.

FIG. 7B illustrates another bar chart 98 expressing a first derivative of the probability values 74, 76, 78, 80, 82, 84, 86, 88, 90, 92, 94, and 96, shown in the bar chart 43 of FIG. 7A. In this case, the bar chart 98 shows that the first derivative has various local peaks 100, 102, and 104, each corresponding to the time segments 52, 60, and 62, respectively. The local peak 102 is the highest of the local peaks 100, 102, and 104.

FIG. 7C illustrates yet another bar chart 106 that expresses a second derivative of the probability values 74, 76, 78, 80, 82, 84, 86, 88, 90, 92, 94, and 96, shown in the bar chart 43 of FIG. 7A. The bar chart 106 confirms that the local peak 102 in FIG. 7B is a local maxima since the second derivative goes from positive to negative from time segment 60 to time segment 62. Thus, time segment 60 has the knee of the probability values shown by the bar chart 43 in FIG. 7A and is the particular time segment in which the failure event is most likely to occur.

FIG. 8 illustrates one embodiment of an RUL system 108 that may be utilized to implement the exemplary procedures described above in FIGS. 4-6. The RUL system 108 includes the RUL estimation module 10 of FIG. 1 and has been configured to operate with a vehicle, which in this case is a helicopter. In this embodiment, the artificial intelligence network of the RUL system 108 includes the BPNs 12, but also includes a neural network 110 and a Self-Organizing Map (SOM) 112; however, the SOM 112 is optional in other embodiments. The BPNs 12, the neural network 110, and the SOM 112 may be thought of as different portions of the artificial intelligence network.

In addition, the RUL system 108 may include condition indicator subsystems 114 for each item being monitored. In one embodiment, the items being monitored by the RUL system 108 are each different machines of the helicopter. For example, the condition indicator subsystems 114 may include a VMS (Vehicle Management System) control condition indicator subsystem, an electrical condition indicator subsystem, a drive condition indicator subsystem, a rotor condition indicator subsystem, a propulsion condition indicator subsystem, and a structural condition indicator subsystem. Each of the condition indicator subsystems 114 may be directed through the neural network 110, which in this embodiment is a dedicated neural network. The neural network 110 ascertains a sequence of m-dimensional condition vectors for each of the condition indicator subsystems 114 using historical data. To do this, the neural network 110 partitions the m-dimensional space of condition vectors. In this manner, the neural network 110, in conjunction with the condition indicator subsystems 114, learns to fuse sensor data 116 into the condition indicators 16. Furthermore, the neural network 110 can adjust the condition indicator subsystems 114 based on the current time 21 or, alternatively, based on a time of measurement from the sensor data 116.

In one embodiment, the neural network 110 is trained to process the condition indicators 16 using historical data recorded for the various machines of the helicopter. Hence, the neural network 110 can process the condition indicators 16 of the helicopter in real-time to describe condition status. The sensor data 116 is provided by a sensor fusion and data characterization module (SFDC) 118. In turn, the SFDC 118 is operably associated with sensors 120 that are provided on components of the various machines of the helicopter. These sensors 120 generate sensor measurement signals that are provided to the SFDC 118. The SFDC 118 may include analog and digital filters designed to help attenuate the effect of high-frequency noise in the sensor measurement signals. Conversions from analog to digital data may also be performed. In addition, data validation techniques may be utilized to implement basic sanity checks and handle missing data. Data normalization may also be implemented to scale the relevant data within normalization ranges.

The nodes in the SOM 112 become specifically tuned to input patterns and discern various operating regimes of the item and/or other items related to the item. For example, the SOM 112 may be utilized to determine the current operating regime of the helicopter, both for the helicopter as a whole and for the various subsystems of the helicopter. The SOM 112 may be utilized to provide guidance to the condition indicator subsystems 114. The learning process of the SOM 112 may be competitive and unsupervised. During the learning process, the SOM 112 discovers the operating regimes from patterns of the inputs. The SOM 112 is used by the RUL tallying subsystem.

As shown in FIG. 8, various regime-based remaining usage tally(ies) 14 may be stored by the RUL system 108. In this embodiment, each regime-based remaining usage tally 14 may correspond to the various subsystems of the helicopter. Using the operating regimes determined by the SOM 112, the amount of usage that has been expended can be estimated. The RUL system 108 can then update the regime-based remaining usage tally(ies) 14 based on the expended usage and provide the updated regime-based remaining usage tally(ies) 14 to the BPNs 12. The condition indicators 16 may be used to determine the regime.

The RUL system 108 also includes maintenance schedules 122 for the item(s). In this embodiment, the RUL system 108 includes maintenance schedules 122 for the various subsystems of the helicopter. These maintenance schedules 122 can be searched by the RUL system 108 to provide the maintenance suggestions 18 for each of the subsystems. A data retrieve module 124 is also included in the RUL system 108. The data retrieve module 124 is operable to retrieve the other heuristics 20 and the current time 21 can be provided to the BPNs 12 from the data retrieve module 124.

Finally, the neural network 110 of FIG. 8 is operable to generate the a priori BPN updates 22 for the BPNs 12 so that the BPNs 12 can learn any new condition states not previously accounted for by the BPNs 12. These a priori BPN updates 22 may be administered under the control of an external management authority.

FIG. 9 illustrates an exemplary apparatus, in this case a computing device 126, configured to provide embodiments of the RUL estimation module 10 or the overall RUL system 108 of FIGS. 2 and 8. The computing device 126 may comprise, for example, a laptop computer; a desktop computer; a workstation; a server; or any other computing device capable of processing data and suitable instructions. The exemplary computing device 126 includes a central processing unit 128 having one or more microprocessors, a system memory 130, and a system bus 132. The system bus 132 provides an interface for system components including, but not limited to, the system memory 130 and the central processing unit 128. The central processing unit 128 can be any of various commercially available or proprietary central processing units.

The system bus 132 may be any of several types of bus structures that may further interconnect to a memory bus (with or without a memory controller), a peripheral bus, and/or a local bus using any of a variety of commercially available bus architectures. The system memory 130 may include non-volatile memory 134 (e.g., read only memory (ROM), erasable programmable read only memory (EPROM), electrically erasable programmable read only memory (EEPROM), etc.) and/or volatile memory 136 (e.g., random access memory (RAM)). A basic input/output system (BIOS) 133 may be stored in the non-volatile memory 134, and can include the basic routines that help to transfer information between elements within the computing device 126. The volatile memory 136 may also include a high-speed RAM, such as static RAM, for caching data. The computing device 126 may further include a storage device 135, which may comprise, for example, an internal hard disk drive (HOD) (e.g., enhanced integrated drive electronics (EIDE) or serial advanced technology attachment (SATA)) for storage, flash memory, or the like. The storage device 135 and associated computer-readable and computer-usable media provide non-volatile storage of data, data structures, computer-executable instructions, and so forth. Although the description of computer-readable media above refers to an HOD, it should be appreciated by those skilled in the art that other types of media that are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage device 135 and in the volatile memory 136, including an operating system 138 and one or more program modules 140, which may implement the functionality described herein in whole or in part. It is to be appreciated that the embodiments can be implemented with various commercially available operating systems 138 or combinations of operating systems 138. All or a portion of the embodiments may be implemented as a computer program product, such as a non-transitory computer-usable or computer-readable medium having a computer-readable program code embodied herein. The computer-readable program code can include software instructions for implementing the functionality of the embodiments described herein that are executed on the central processing unit 128.

The central processing unit 128, in conjunction with the program modules 140 in the volatile memory 136, may serve as a control system for the computing device 126 that is configured to, or adapted to, implement the functionality described herein. An administrator may be able to enter commands and information into the computing device 126 through one or more input devices, such as, for example, the display device 127 which is a monitor; a keyboard; or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 128 through an input device interface 142 that is coupled to the system bus 132, but can be connected by other interfaces such as a parallel port, an IEEE 1394 serial port, a game port, a universal serial bus (USB) port, an IR interface, etc. The computing device 126 preferably includes a communication interface 146 for communicating with a communication network. The computing device 126 may drive a separate display device 30, which may also be connected to the system bus 132 via the input device interface 142. In this example, the display device 30 is a hardware device that includes a plurality of visual sectors driven by LEDs as described above.

Those skilled in the art will recognize improvements and modifications to the preferred embodiments of the present disclosure. All such improvements and modifications are considered within the scope of the concepts disclosed herein and the claims that follow.

What is claimed is:

1. A method, comprising:
   receiving sensor data from sensors operably associated with an item;
   determining, by a computing device comprising a processor, based at least in part on the sensor data, a plurality of probability values associated with a future time period comprising a plurality of time segments, each probability value corresponding to a different time segment of the plurality of time segments and quantifying a probability that a failure event of the item will occur by a time in the different time segment;
   determining, by the computing device, a particular time segment of the plurality of time segments in which the failure event has a greatest likelihood to occur based on the plurality of probability values by:
      calculating a first derivative of the plurality of probability values with respect to time:
      calculating a second derivative of the plurality of probability values with respect to time; and
      identifying a knee that corresponds to the particular time segment in which the failure event is most likely to occur from the first derivative and the second derivative; and
   effecting, by the computing device, presentation of a visual representation of at least a portion of the future time period, wherein the visual representation indicates that the failure event of the item has a greatest likelihood to occur during the particular time segment.

2. The method of claim 1, wherein determining the plurality of probability values comprises determining the plurality of probability values with an artificial intelligence network.

3. The method of claim 2, wherein the artificial intelligence network comprises a plurality of Bayesian probability networks each configured to determine a different one of the plurality of probability values.

4. The method of claim 2, wherein the artificial intelligence network has been trained to use a plurality of operational indicators that each indicate an operational event related to the item as a priori conditions, and wherein determining the plurality of probability values with the artificial intelligence network further comprises:
- inputting a set of one or more of the plurality of operational indicators into the artificial intelligence network;
- outputting the plurality of probability values from the artificial intelligence network such that the plurality of probability values comprises a plurality of conditional probability values, each conditional probability value quantifying the probability that the failure event of the item will occur by the time in the time segment based on the set of the one or more of the plurality of operational indicators.

5. The method of claim 4, wherein inputting the set of the one or more of the plurality of operational indicators into the artificial intelligence network further comprises:
- receiving sensor data from sensors operably associated with the item;
- analyzing the sensor data to generate at least one condition indicator that indicates an operational condition of the item, wherein the set of the one or more of the plurality of operational indicators comprises the at least one condition indicator.

6. The method of claim 5, wherein the sensor data is received in real time.

7. The method of claim 5, wherein, after analyzing the sensor data to generate the at least one condition indicator, the method further comprises:
- obtaining a regime-based remaining usage tally that indicates a remaining use of the item wherein the set of the one or more of the plurality of operational indicators further include the regime-based remaining usage tally.

8. The method of claim 7, wherein obtaining the regime-based remaining usage tally that indicates the remaining use of the item, comprises:
- obtaining a previous regime-based remaining usage tally that indicates a previous remaining use of the item;
- updating the previous regime-based remaining usage tally based on the at least one condition indicator so as to generate an updated regime-based remaining usage tally that indicates an updated remaining use of the item, wherein the regime-based remaining usage tally included in the set of the one or more of the plurality of operational indicators is the updated regime-based remaining usage tally.

9. The method of claim 1, wherein at least the portion of the future time period comprises the entire future time period.

10. The method of claim 1, wherein the visual representation comprises a plurality of distinct visual sectors wherein each of the plurality of distinct visual sectors corresponds to a different one of the plurality of time segments within at least the portion of the future time period and wherein effecting presentation of the visual representation comprises:
- effecting presentation in a first visual state of one or more of the plurality of distinct visual sectors that each correspond to one or more time segments of the plurality of time segments that are before the particular time segment in which the failure event of the item has a greatest likelihood to occur;
- effecting presentation in a second visual state of a particular distinct visual sector of the plurality of distinct visual sectors that corresponds to the particular time segment in which the failure event of the item has a greatest likelihood to occur.

11. The method of claim 1, wherein the visual representation comprises a plurality of distinct visual sectors wherein each of the plurality of distinct visual sectors corresponds to a different one of the plurality of time segments within at least the portion of the future time period and the visual representation of a distinct visual sector that corresponds to the particular time segment is different from an adjacent distinct visual sector and wherein the distinct visual sector that corresponds to the particular time segment is presented in a first color, and the adjacent distinct visual sector is presented in a second color that is different from the first color.

12. The method of claim 1, wherein the knee identifies the particular time segment in which a rate at which the probability that the failure event of the item will occur has a greatest increase.

13. A method, comprising:
- determining a plurality of probability values associated with a future time period comprising a plurality of time segments, each probability value corresponding to a different time segment of the plurality of time segments and quantifying a probability that a failure event of an item will occur by a time in the different time segment;
- determining a particular time segment of the plurality of time segments in which the failure event is most likely to occur based on the plurality of probability values, by:
  - calculating a first derivative of the plurality of probability values with respect to time:
  - calculating a second derivative of the plurality of probability values with respect to time; and
  - identifying a knee that corresponds to a particular time segment in which the failure event is most likely to occur from the first derivative and the second derivative; and
- effecting presentation of a visual representation having a plurality of distinct visual sectors, wherein each distinct visual sector of the plurality of distinct visual sectors represents a different one of the plurality of time segments and a visual intensity of a visual characteristic of the distinct visual sector is based on the plurality of probability values.

14. The method of claim 13, wherein, for each of the plurality of distinct visual sectors, the visual intensity is set in accordance with the probability value corresponding to the different one of the plurality of time segments.

15. The method of claim 13,
wherein effecting presentation of the visual representation having the plurality of distinct visual sectors further comprises providing the visual intensity of a one of the distinct visual sectors that represents the particular time segment so that the visual intensity of the one of the distinct visual sectors indicates that the failure event of the item has a greatest likelihood to occur within the particular time segment.

16. The method of claim 13, wherein determining the plurality of probability values comprises determining each one of the plurality of probability values with an artificial intelligence network.

17. The method of claim 16, wherein the artificial intelligence network has been trained to use a plurality of operational indicators that each indicate an operational event related to the item as a priori conditions, and wherein determining the plurality of probability values with the artificial intelligence network further comprises:
  inputting a set of one or more of the plurality of operational indicators into the artificial intelligence network; and
  outputting the plurality of probability values from the artificial intelligence network such that the plurality of probability values comprises a plurality of conditional probability values, each conditional probability value quantifying the probability that the failure event of the item will occur by the time in the time segment based on the set of the one or more of the plurality of operational indicators.

18. The method of claim 17, wherein inputting the set of one or more of the plurality of operational indicators into the artificial intelligence network further comprises:
  receiving sensor data from sensors operably associated with the item; and
  analyzing the sensor data to generate at least one condition indicator that indicates an operational condition of the item, wherein the set of the one or more of the plurality of operational indicators comprises the at least one condition indicator.

19. An apparatus, comprising:
  at least one non-transitory computer-readable medium that stores computer-executable instructions;
  at least one microprocessor operably associated with the at least one non-transitory computer-readable medium wherein the computer-executable instructions instruct the at least one microprocessor to:
    receive sensor data from sensors operably associated with an item;
    determine a plurality of probability values associated with a future time period, wherein the future time period defines a plurality of time segments and each of the plurality of probability values quantifies a probability that a failure event of the item will occur by a time in a different one of the plurality of time segments;
    determine a particular time segment of the plurality of time segments in which the failure event has a maximum probability of occurrence based on the plurality of probability values by:
      calculating a first derivative of the plurality of probability values with respect to time;
      calculating a second derivative of the plurality of probability values with respect to time; and
      identifying a knee that corresponds to the particular time segment in which the failure event is most likely to occur from the first derivative and the second derivative; and
    effect presentation of a visual representation representing at least a portion of the future time period, wherein the visual representation indicates that the failure event of the item has a greatest likelihood to occur during the particular time segment.

20. The apparatus of claim 19, wherein the computer-executable instructions instruct the at least one microprocessor to determine the plurality of probability values by implementing an artificial intelligence network, wherein the artificial intelligence network is trained to use a plurality of operational indicators as a priori conditions to determine the plurality of probability values, and wherein each of the plurality of operational indicators indicates an operational event related to the item.

21. The apparatus of claim 19, wherein the item is a machine provided within a vehicle and the apparatus is mountable in the vehicle.

* * * * *